United States Patent [19]

Aicher et al.

[11] 3,928,460

[45] Dec. 23, 1975

[54] PRODUCTION OF COMBUSTION GAS TO HEAT SILVER CATALYST

[75] Inventors: Albrecht Aicher, Frankenthal; Hans Diem; Hans Haas, both of Ludwigshafen; Klaus Hess, Bad Duerkheim; Oskar Hussy, Ludwigshafen; Guenther Matthias, Ludwigshafen; Heinrich Sperber, Ludwigshafen; Richard Stickel, Bad Duerkheim, all of Germany

[73] Assignee: Badische Anilin- & Soda-Fabrik Aktiengesellschaft, Ludwigshafen (Rhine), Germany

[22] Filed: May 14, 1973

[21] Appl. No.: 360,076

[30] Foreign Application Priority Data
May 18, 1972 Germany.......................2224223

[52] U.S. Cl.............. 260/603 C; 252/373; 252/410; 252/411; 252/476

[51] Int. Cl.² .................... C07C 45/16; B01J 23/48

[58] Field of Search ........... 252/411, 476, 373, 410; 48/197 R; 423/648; 44/53; 260/603 HF; 431/12

[56] References Cited
UNITED STATES PATENTS

| | | |
|---|---|---|
| 1,843,063 | 1/1932 | Burke .................................. 252/373 |
| 1,888,066 | 11/1932 | Bond .................................. 252/476 |
| 2,056,175 | 10/1936 | Eberle et al. ...................... 48/197 R |
| 2,482,742 | 9/1949 | Carter et al. ................... 260/603 HF |
| 2,662,817 | 12/1953 | Russell et al. ........................ 44/53 |
| 2,773,844 | 12/1956 | Carlson et al. ..................... 252/463 |
| 3,250,601 | 5/1966 | Jenny .................................. 252/373 |
| 3,685,977 | 8/1972 | Goodman ............................ 252/373 |

Primary Examiner—Winston A. Douglas
Assistant Examiner—P. E. Konopka
Attorney, Agent, or Firm—Johnston, Root, O Keeffe, Keil, Thompson & Shurtleff

[57] ABSTRACT

The production of combustion gas containing little or no carbon black by mixing a starting mixture of oxygen and methanol with more oxygen in specific proportions, igniting the mixture thus prepared and incompletely burning the methanol in the flame formed. The gas may be used advantageously in all cases where deposition of soot would be troublesome. It may be used with advantage for heating catalysts in catalytic syntheses, for example silver catalysts to be used for catalyzing the reaction of methanol with oxygen to form formaldehyde.

5 Claims, No Drawings

PRODUCTION OF COMBUSTION GAS TO HEAT SILVER CATALYST

The invention relates to a process for the production of combustion gas substantially devoid of soot by mixing a starting mixture oxygen and methanol with more oxygen in a specific ratio by weight, igniting the final mixture thus prepared and incompletely burning the methanol in the flame formed.

It is known from Ullmanns Encyklopedie der technischen Chemie, volume 4, pages 649 et seq. that fuel gas in the form of mixtures of air and gaseous or liquid hydrocarbons, for example methane, benzene or naphtha, may be burned and the combustion gas thus obtained may be used as heating gas. Such combustion gas almost always contains a certain amount of soot or carbon black; soot forms particularly in the incomplete combustion of hydrocarbons (Ullmann, loc. cit., volume 14, pages 793 and 794; Hoffmann, "Anorganische Chemie" (Vieweg, Braunschweig, 16th edition), page 330). Soot is finely divided carbon which contains oxygen, hydrogen and to a smaller extent sulfur, nitrogen and other substances. Deposition of soot disturbs the heating effect and an excess of air is therefore used so that carbon in the hydrocaebon feed is burned as far as possible at the same time as the hydrogen (Ullmann, loc. cit., volume 4, page 709). Sooty combustion gas may contain up to 10% by weight of soot, based on the weight of hydrocarbon used, depending on how complete combustion is. Not only does deposition of soot decrease the heating effect but is also causes other problems, for example the cost of cleaning plant and pipe connections, clogging of valves or tube constrictions and consequently breakdowns, impairment of chemical reactions by the presence of soot or decrease in the activity or poisoning of catalysts.

It is an object of this invention to provide a novel process for preparing combustion gas containing little or no soot and generally without a detectable soot content in a simpler and more economical manner.

We have found that combustion gas containing little or no soot is advantageously obtained at from 400° to 1,300°C by mixing a starting mixture of methanol and oxygen in a ratio of from 1 to 10 percent by weight of oxygen based on methanol and at a flow rate of from 50 to 500 meters per second with oxygen at a flow rate of from 1 to 20 meters per second in a ratio of from 10 to 80 percent by weight of additional oxygen based on the starting mixture, igniting the final mixture thus prepared and buring from 85 to 99 percent by weight of the total amount of methanol in the flame formed.

Having regard to the prior art the process according to the invention gives combustion gas containing little or no soot, generally without a detectable soot content, in a simpler and more economical manner. These advantageous results are surprising in view of the fact that the combustion of the methanol in accordance with the invention with a deficiency of oxygen or air is incomplete. The combustion gas may be used as heating gas even in cases in which deposition of soot would be disturbing, for example for heating oxidic catalysts such as oxides of iron, molybdenum, cobalt, nickel, tungsten, aluminum, titanium, phosphorus and chromium. It may be used advantageously for heating catalysts in catalytic syntheses, for example silver catalysts which catalyze the reaction of methanol with oxygen to form formaldehyde. Such heating gases are also particularly interesting in industries or regions where other starting materials for the production of combustion gas such as benzene or naphtha, or nitrogen as a heating gas are not available or are uneconomical. Moreover when nitrogen is used for syntheses, for example the abovementioned production of formaldehyde, as a heating gas it sometimes has to be specially purified. Air cannot be used as heating gas for syntheses in which components of the air could form explosive mixtures in the subsequent reaction, for example in reactions with alkanols. Illuminating gas and town gas give heating gases which contain not only soot but also sulfur and thus for example imapir or poison many catalysts and promote corrosion of plant. Indirect heating on the other hand is uneconomical on a large scale and uniform heating to high catalyst temperatures cannot be achieved in this way. Local overheating in the middle of the bed of catalyst and the formation of soot are observed in electrical heating. In all the said cases the process of the invention offers an economically advantageous and reliable heating gas in a simple manner. In the case of the production of formaldehyde the catalyst is rapidly and uniformly heated up to the desired temperature and the conventional heating up period is shortened.

Combustion is generally carried out in a furnace which comprises means for supplying the starting mixture and the extra oxygen, appropriate ignition means and means for withdrawing the combustion gas. Mixtures containing oxygen, conveniently air, may be used instead of oxygen in the starting mixture or instead of the additional oxygen. The components methanol and oxygen or air which form the starting mixture may be passed into the combustion furnace separately or through an appropriate nozzle or a burner. Methanol may be supplied as vapor or liquid; the mixture of vapor and gas or the fine dispersion of liquid methanol in the form of droplets in the oxygen or in the air supplied may be introduced into an initial mixing nozzle or into the nozzle of the burner. The burner may be one of those conventionally used for the combustion of gases such as a tubular burner, multiport burner, Meker burner, ejector burner, fan burner, such as a parallel-stream burner or a cross-stream burner with or without swirl, swirl-flow burner or premix burner.

The starting mixture preferably has a ratio of from 5 to 8 percent by weight of oxygen, based on methanol, and a flow velocity of from 130 to 280 meters per second. Suitable pressures for the finished mixture are from 1.5 to 6 atmospheres. In the case of separate supply the components are supplied at such a pressure, for example 2 to 6 atmospheres, that the said ratio by weight and flow velocity of the starting mixture are set up at entry into the burner. The components are generally supplied at room temperature. Suitable starting materials for the process are pure methanol, technical methanol and advantageously mixtures of the same with water; the concentration of the aqueous mixture may conveniently be from 60 to 95 percent by weight and preferably from 70 to 90 percent by weight. Crude methanol which can be purified by treatment with oxidizing agents and/or alkalies by the methods described in DAS No. 1,277,834 and German Pat. No. 1,235,881 may also be used. Water may if desired also be supplied separately as vapor or liquid, the rate of supply conveniently corresponding to the abovementioned relative proportions based on methanol.

From 10 to 500 grams and advantageously from 15 to 300 grams of methanol per second is generally burned in the case of a furnace having a combustion chamber of from 0.1 to 3.0 cubic meters.

The starting mixture has the additional oxygen or conveniently the additional air mixed with it advantageously as it leaves the burner or nozzle. The oxygen may be supplied inside or outside the burner, for example through a feed pipe of the combustion furnace, preferably with a flow velocity of from 3 to 8 meters per second and at a pressure of from 1.1 to 7 atmospheres. The ratio is advantageously from 15 to 30 percent by weight of oxgen based on the starting mixture which leaves the burner. Supply of the additional oxygen conveniently takes place within a distance of 20 centimeters from the outlet from the burner.

After the starting mixture has been mixed with the additional oxygen the end mixture thus formed is ignited in a conventional way, for example by electric sparks of from 5,000 to 20,000 volts. The ignition temperature of the final mixture is between 400° and 500°C. After ignition a luminous flame forms which contains little or no soot and has a combustion temperature of from 400° to 1,300°C, preferably of from 600° to 700°C (measured at the end of the flame cone). The combustion heat may conveniently amount to from 0.9 to 1.5 kcal/m$^3$ (STP). The flame velocity is conveniently from 50 to 200 meters per second. It is advantageous to adjust the flame cone by appropriate regulation of the additional oxygen so that the distance from the apex of the cone at the outlet of the burner to the end of the cone (cone height) is from 50 to 230 centimeters. The diameter of the base of the cone or the maximum diameter of the flame cone is advantageously from 10 to 60 centimeters. The greater the amount of additional oxygen supplied, the smaller is the said cone height and the hotter is the flame; at a flow velocity of 15 meters per second and 63 percent by weight of oxygen based on the starting mixture, the temperature at the end of the flame cone is 1,300°C, and at a flow velocity of 5 meters per second and 18 percent by weight of oxygen it is 800°C. The length of the combustion furnace is advantageously from 1.2 times to twice the length of the flame cone, and the diameter (or in the case of a rectangular furnace the height) of the combustion furnace is advantageously from 1.5 times to twice the diameter of the flame cone. The combustion may be carried out batchwise but as a rule continuously. Conveniently a total pressure of from 1.1 to 6, preferably from 1.1 to 2.5, atmospheres is set up in the combustion chamber.

In a preferred embodiment of the process from 200 to 300 grams of methanol is burned per second under the abovementioned preferred conditions of combustion and flame cone geometry. Ignition is effected with a subsidiary burner conveniently fitted beneath the main burner and burning from 5 to 15 grams of methanol per second, the flame cone height being from 20 to 80 cm and the cone diameter from 8 to 20 cm. All the other conditions of the auxiliary burner for example flame cone, temperature, flow velocities, composition of the starting mixture, type of burner and volume of additional air correspond as a rule to those of the main burner.

The combustion gas thus obtained as a rule contains from 0.01 to 0.3 percent by weight of formaldehyde, from 3 to 7 percent by weight of methanol, from 10 to 20 percent by weight of water (without any water contained in the starting mixture), from 2 to 8 percent by weight of carbon dioxide, from 10 to 15 percent by weight of carbon monoxide, from 1 to 2 percent by weight of hydrogen and from 40 to 61 percent by weight of nitrogen. When air is used as oxidant and crude methanol is used as feedstock, this being of interest for commerical operation, the combustion gas contains rare gases, such as argon, and impurities, as for example dimethyl ether, ammonia, and monomethylamine. If the crude methanol contains alkali, for example in the form of sodium hydroxide or sodium formate, it is usually supplied to the reaction in the form of vapor. The combustion gas conveniently leaves the end of the combustion furnace removed from the burner at atmospheric of superatomspheric pressure and may be used as fuel gas without further processing.

The combustion gas obtained according to the invention is advantageously used for heating the silver catalyst which catalyzes the reaction of methanol with oxygen to form formaldehyde. Poisoning of the catalyst does not take place and surprisingly the life of the catalyst is lengthened from 1.3 times to twice. The catalyst may be heated by the combustion gas to the reaction temperature, for example from 500° to 800°C, or to a lower temperature, for example 300° to 500°C, following which the oxidation of methanol to formaldehyde may be carried out. It is also convenient to heat the catalyst for example to the said lower temperature with the combustion gas and then to carry out the oxidation of the methanol, the temperature (which if desired is controlled by the composition and/or flow velocity of the starting mixture) then being raised for example to the abovementioned higher reaction temperature. Similarly the catalyst may be heated up and the reaction carried out at the same time by passing over or through the catalyst a mixture of the combustion gas with the starting mixture of the formaldehyde synthesis, for example methanol, oxygen or air and conveniently steam, the silver catalyst being heated up by the combustion gas and the heat of reaction of the methanol oxidation. This method may be carried out in one stage up to the reaction temperature or in two stages, at a lower initial temperature and then at the reaction temperature. The flow velocity in the heating of the catalyst is advantageously from 200 to 300 kilograms of combustion gas per square meter of catalyst bed cross-sectional area per hour. When the combustion gas is mixed with the starting mixture for the reaction, a ratio of from 0.1 to 0.5 part by weight of oxygen in the starting mixture of the methanol oxidation to 1 part by weight of combustion gas is conveniently chosen. The oxidation may be carried out by conventional methods, for example the methods for the production of formaldeyhde described in Ullmanns Encyklopadie der technischen Chemie, volume 7, pages 659 et seq., or by the abovementioned method using a low heating temperature of the catalyst.

Suitable feedstocks for the oxidation include pure methanol, technical methanol and advantageously a mixture of the same with water; in concentration of the aqueous mixture may conveniently be from 60 to 95 percent by weight and preferably from 70 to 90 percent by weight of methanol. Crude methanol which as a rule is purified by the methods described in DAS No. 1,277,834 and German Pat. No. 1,235,881 by treatment with oxidizing agents and/or alkalies may also be used.

The methanol is supplied to the reaction zone as a rule in vapor form and if desired mixed with inert gas. Nitrogen for example is suitable as an inert gas for the oxidation.

The oxidizing agent used may be pure oxygen or a gas containing free oxygen, particularly air. Oxygen and methanol are conveniently used in a molar ratio of from 0.15 to 0.6 mole, particularly from 0.15 to 0.5 mole, of oxygen per mole of methanol, or methanol and air conveniently in a molar ratio of 1 mole of methanol to from 1.4 to 2.9 moles of air. The total volume of steam is preferably from 0.8 to 1.9 parts by volume per 1 part by volume of methanol vapor.

Any silver catalyst is suitable for the oxidation, for example those described in DAS No. 1,231,229 and Ullmanns Encyklopadie der technischen Chemie, volume 7, pages 659 et seq. It is preferred to use two-layer silver catalysts, for example the catalysts set out in DAS No. 1,294,360 and German Pat. No. 1,903,197. The said publications may be referred to for details of the production of the catalyst and performance of the appropriate reaction with these catalysts. A preferred embodiment of the oxidation consists in carrying out the reaction in contact with a two-layer catalyst of which the lower layer has a thickness of from 15 to 40 mm, particularly from 20 to 30 mm, and consists to the extent of at least 50 percent by weight of crystals of a particle size of from 1 to 4 mm, particularly from 1 to 2.5 mm, and of which the upper layer has a thickness of from 0.75 to 3 mm, particularly from 1 to 2 mm and consists of crystals of particle sizes of from 0.1 to 1 mm, particularly from 0.2 to 0.75 mm, the space velocity being from 1 to 3 metric tons, particularly from 1.4 to 2.4 metric tons, of methanol per $m^2$ of catalyst bed cross-sectional area per hour. When carrying out the reaction on a large scale it is preferred to use a catalyst bed diameter of at least 0.5 meter and conveniently from 1 to 3 meters.

The oxidation is carried out in other respects in a conventional manner, for example by passing a gas mixture of methanol vapor, air, optionally inert gas and conveniently steam in the abovementioned amounts at a temperature of from about 550° to 780°C, particularly from 600° to 750°C, through the silver catalyst. It is convenient to cool the reaction gas leaving the catalyst zone within a short time, for example in less than one-tenth second, for example to a temperature of 350°C. The cooled gas mixture is then conveniently supplied to an absorption tower in which the formaldehyde is scrubbed with water, advantageously countercurrent, from the gas mixture.

The oxidation is generally carried out continuously at a pressure of from 0.5 to 2 atmospheres, preferably from 0.8 to 1.8 atmospheres.

The following Examples illustrate the invention. The parts are by weight.

EXAMPLE 1

1 part of liquid methanol, 0.3 part of steam and 0.28 part of air are supplied separately from one another, mixed with one another in a burner to form the starting mixture and introduced at a flow velocity of 205 meters per second and a total pressure of 3 atmospheres into a furnace having a length of 3 meters and a diameter of 0.8 meter. 1.18 parts of additional air is passed in at a flow velocity of 5 meters per second and a pressure of 2.5 atmospheres into the furnace 20 centimeters above the burner through a feed pipe so that the air is mixed with the starting mixture ahead of the burner outlet.

An auxiliary burner of the same design is situated 30 centimeters below the burner and through this 0.055 part of methanol, 0.0165 part of water and 0.0235 part of air are passed. The partial mixture of the auxiliary burner is mixed with a partial stream (0.235 part) of additional air in the same way so that flow velocities correspond to the conditions of the starting mixture. The partial mixture of the auxiliary burner, after it has mixed with the additional air, is ignited by means of an electric spark (10,000 volts). The ignition temperature is 455°C. The flame formed has a cone height of 55 centimeters, a cone diameter of 15 centimeters and a combustion temperature of 850°C. It serves to ignite the starting mixture after it has mixed with the additional air (final mixture). The auxiliary burner is shut off after the main burner has been ignited.

After the final mixture has been ignited a flame forms which has a cone height of 220 centimeters measured at the outlet of the burner and a cone diameter of 50 centimeters and a combustion temperature of 650°C measured at the end of the flame cone. The total pressure in the furnace is 1.5 atmospheres and the combustion heat is 1.2 kcal/$m^3$ (STP). 2.77 parts per hour of combustion gas at 650°C is formed which contains 0.02% by weight of formaldehyde, 5.5% by weight of methanol, 10.9% by weight of water, 7.8% by weight of carbon dioxide, 13.5% by weight of carbon monoxide, 1.1% by weight of hydrogen, 60.1% by weight of nitrogen, 1.07% by weight of argon and 0.01% by weight of impurities, which is withdrawn at the other end of the combustion furnace and may immediately be used as fuel gas. After operation for 1,000 hours no soot can be detected in the combustion gas.

EXAMPLE 2 (Use)

The combustion is carried out as described in Example 1 and the combustion gas having a composition analogous to that specified in Example 1 is passed over a two-layer silver catalyst of which the lower layer has a thickness of 25 mm and consists to the extent of 90% by weight of crystals of a particle size of from 1 to 2.5 mm and of which the upper layer has a thickness of 1.5 mm and consists of crystals having particle sizes of from 0.2 to 0.75 mm. The flow velocity is 263 kilograms of combustion gas per square meter of catalyst bed cross-sectional area per hour. The catalyst is heated up to 330°C within thirty minutes. The supply of combustion gas is then shut off and a mixture of 300 parts of methanol and 75 parts of water is vaporized per hour mixed with 402 parts by volume of air and passed over the two-layer catalyst at 1.3 atmospheres, the temperature rising within ten minutes to 650°C. The reaction mixture is then quickly cooled to 350°C and after further cooling is absorbed in water in an absorption tower. 251 parts per hour of formaldehyde (calculated as 100 percent) is obtained in the form of a 55% by weight aqueous solution having a methanol content of 0.7 percent by weight. This is equivalent to a yield of 89.3 percent of theory. The yield of end product and the methanol content of the formaldehyde solution obtained remain constant for seventeen weeks.

If heating is carried out with electrical heating instead of combustion gas and then the reaction is carried out in the manner described, the same yield of formaldehyde is obtained but it falls to 86 percent of theory within twelve weeks.

We claim:

1. In a process for heating up a silver catalyst in the catalytic syntheses of formaldehyde from methanol and oxygen, the improvement of producing a combustion gas of 400° to 1300°C. used to initially heat said catalyst which comprises:

mixing (a) a starting gas mixture consisting essentially of methanol and from 1 to 10 percent by weight of oxygen based on methanol having a flow velocity of from 50 to 500 meters per second with (b) oxygen having a flow velocity of from 1 to 20 meters per second in a ratio of from 10 to 80 percent by weight of additional oxygen based on the starting mixture;

igniting the resulting final mixture consisting essentially of methanol and oxygen and burning only from 85 to 99 percent by weight of the total amount of methanol in the flame formed; and heating said silver catalyst with the combustion gas formed by the burned mixture.

2. A process as claimed in claim 1 wherein the starting gas mixture is formed with a ratio of from 5 to 8 percent by weight of oxygen based on methanol and a flow velocity of from 130 to 280 meters per second.

3. A process as claimed in claim 1 wherein the burning of the final mixture is carried out at a total pressure of from 1.1 to 6 atmospheres.

4. A process as claimed in claim 1 wherein the combustion gas is produced at a temperature of from 600° to 700°C.

5. A process as claimed in claim 1 wherein the starting gas mixture is formed with from 200 to 300 grams of methanol per second.

* * * * *